G. A. PHAIL & C. SWANSON.
LOCKING CLAMP FOR EXTRA AUTOMOBILE TIRES.
APPLICATION FILED NOV. 24, 1906. RENEWED MAY 7, 1910.
967,047.
Patented Aug. 9, 1910.
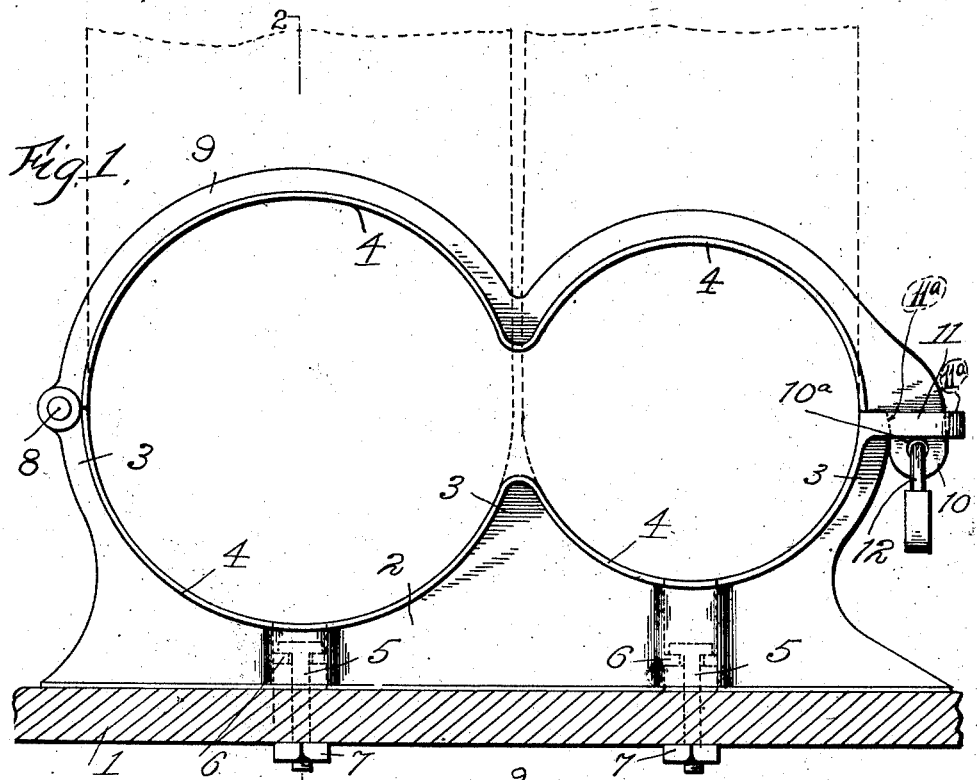
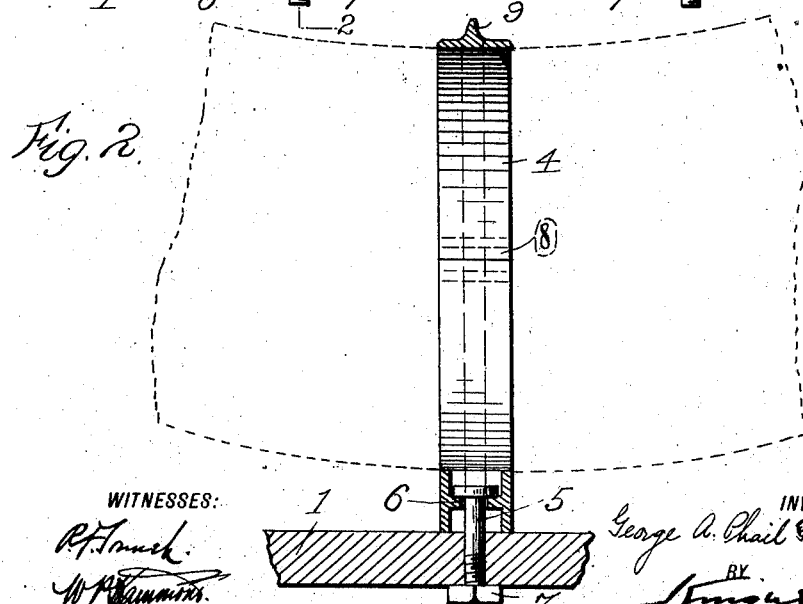

UNITED STATES PATENT OFFICE.

GEORGE A. PHAIL AND CHARLES SWANSON, OF NEW YORK, N. Y.

LOCKING-CLAMP FOR EXTRA AUTOMOBILE-TIRES.

967,047.  Specification of Letters Patent.  Patented Aug. 9, 1910.

Application filed November 24, 1906, Serial No. 344,974.  Renewed May 7, 1910. Serial No. 560,066.

*To all whom it may concern:*

Be it known that we, GEORGE A. PHAIL and CHARLES SWANSON, citizens of the United States of America, residing in the borough of Bronx and borough of Manhattan, respectively, city and State of New York, have invented certain new and useful Improvements in Locking-Clamps for Extra Automobile-Tires, of which the following is a specification.

It is customary for automobilists to carry with them one or more extra tires to replace those injured while traveling. Such tires are customarily fastened by straps, cords or the like to the machine, and are frequently stolen, owing to the insecurity of such attachment.

Our invention is designed to prevent such loss by providing a secure locking clamp for the extra tires, and consists in the construction hereinafter fully described with reference to the accompanying drawings, and more particularly pointed out in the claims.

In the drawings Figure 1 is an elevation of our locking clamp shown in position, the step or support upon the automobile to which it is secured being shown in section. Fig. 2 is a transverse sectional view on the line 2—2, Fig. 1.

In carrying out our invention we utilize a horizontal bracket upon the automobile, preferably the customary step or support 1 which extends longitudinally on the side of the car body between the wheel guards. Mounted transversely of the step or support 1, and in a vertical position thereon, is a clamp having a lower or base member 2 provided with upwardly extending lugs or projections 3, forming a plurality of semi-circular recesses provided with marginal flanges 4. Located in the base member 2 are a plurality of vertical ribs or enlargements having vertical apertures each of a diameter slightly greater than the head of a bolt 5, which is adapted to be engaged by annular ledges, lugs or projections 6 on the inner surface of said apertures. The threaded portion of the bolt 5 is passed through the step or support and the base member firmly secured thereto by means of a nut 7.

At one end of the base member 2 the end lug or projection 3 forms one portion of a hinge 8 connecting the upper movable member 9 of the clamp, which is of double yoke shape forming a plurality of semi-circular recesses provided with marginal flanges 4, and corresponds to the base member 2. The free end of the movable member 9 is formed with a downwardly projecting tongue 10 which is adapted to pass through a longitudinal opening or slot or opening 11ª in the horizontal arm or shoulder 11 formed on the opposite end projection 3 of the base member 2. The tongue 10 is provided with a transverse opening 10ª beneath the arm or shoulder, through which the shank of a padlock 12 may be passed.

It will be observed that the formation of the base member and movable member is such that the semi-circular recesses therein, when the movable member is locked in position, form two circles of different sizes, which construction makes it possible to place therein a pair of tires which are of different diameters and maintain them in an upright position in the same plane. Further, the method of sinking the bolts in the base member 2 beneath the seat for the tires renders it impossible to detach the clamp from its support without first removing the tires therefrom.

Our device may be made of any material having the requisite strength and stability, and instead of the means herein shown for securing the base member to its support, screws or other suitable fastening devices may be employed. If desired the locking means herein shown may be dispensed with, and any other suitable form of lock substituted therefor without departing from the spirit and scope of our invention.

Having thus described our invention, what we claim as new and desire to secure by Letters Patent is:

1. In a locking clamp for extra automobile tires, the combination with a supporting bracket upon the vehicle of a base member having upwardly-extending lateral and intermediate walls forming a plurality of segmental tire receiving seats, or recesses, with an upper clamp member of approximately the same width as the base member and projecting over, and in the same plane as, the base member and closing said seats, or recesses, with its ends in engagement with said lateral walls and means for locking said clamp member in close position upon the base member.

2. In a locking clamp for extra automobile tires, the combination with a supporting bracket upon the vehicle of a base member having upwardly extending lateral and intermediate walls forming a plurality of segmental tire supporting seats, or recesses, a clamping member of approximately the same width as the base member and hinged to one of said lateral walls and projecting over and in the same plane as the base member, and closing said seats, or recesses, with its free end in engagement with the other lateral wall, and means for locking the free end of said clamping member to said other lateral wall.

3. In a locking clamp for extra automobile tires, the combination of a base member having upwardly extending lateral and intermediate walls forming tire supporting seats or recesses, a clamping bar or member hinged at one end to one of said lateral walls and formed at its free end with a bolt receiving opening, and a slotted flange upon the other of said lateral walls to receive the free end of said clamping bar or member.

4. In a locking clamp for extra automobile tires, the combination with a supporting bracket upon the vehicle of a base member formed with a plurality of upwardly presented segmental recesses, or seats, for supporting tires, with a seat closing clamping bar, or member of approximately the same width as the base member, and formed with a corresponding plurality of downwardly presented curved recesses, and hinged at one end to said base member, projecting over and in the same plane as the base member, with its free end adapted to move into engagement with the base member, and means for locking the free end of said clamping member to the base member.

5. In a locking clamp for extra automobile tires, the combination with a supporting bracket upon the vehicle of a base member having upwardly presented lateral and intermediate walls forming a plurality of segmental tire supporting seats, or recesses, said intermediate wall being of less height than said lateral walls, with a transverse clamping bar of approximately the same width as the base member and hinged at one end to one of said lateral walls, and adapted to extend over the tire supporting seats, or recesses, in the same plane as the base member with its free end in engagement with the other lateral wall, and a lock for locking the free end of said clamping bar in closed position upon said other lateral wall.

6. In a locking clamp for extra automobile tires, the combination with a lower clamp member formed with a supporting base, a curved recess or tire supporting seat above the base, and a bolt receiving opening extending through said base and opening into said recess or seat, with a coöperating upper clamp member.

7. In a locking clamp for extra automobile tires, the combination of a lower clamp member formed with a supporting base, a plurality of upwardly presented curved recesses or tire supporting seats above the base, and bolt receiving openings extending through the base and opening into said recesses or seats, with a coöperating upper clamp member projecting over said recesses or seats.

8. In a locking clamp for extra automobile tires, the combination of an upright lower clamp member formed with a plurality of upwardly extending lugs or walls providing curved tire supporting seats or recesses transversely thereof, means beneath said seats or recesses for securing the lower clamp member upon a suitable support, and an upper clamping member having means for securing it to the lower member.

9. In a locking clamp for extra automobile tires, the combination of a lower clamp member having a base, and a curved tire supporting recess or seat above the base, said lower clamp member being formed with a vertical aperture through the base opening into the tire supporting recess or seat and having a horizontal projection located therein a distance beneath said recess or seat, a headed bolt mounted in said aperture in engagement with said projection, and an upper clamp member having means for securing it to the lower clamp member.

10. In a locking clamp for extra automobile tires, the combination of an upright lower clamping member formed with a plurality of upwardly presented lugs or walls providing curved tire supporting seats or recesses transversely thereof, said lower clamp member being formed with vertical apertures beneath said seats or recesses and horizontal projections located therein a distance beneath said seats or recesses, bolts for securing said lower clamp member upon a suitable support, said bolts having their heads seated upon said horizontal projections within said apertures, and an upper clamp member having means for securing it to the lower clamp member.

11. In a locking clamp for extra automobile tires, the combination of a base plate formed with bolt receiving openings, and upwardly presented walls providing tire supporting recesses or seats above said bolt receiving opening, an upper clamping member hinged to one of said walls and projecting over said tire supporting recesses or seats into engagement with another of said walls, and a lock upon the free end of said upper clamping member.

GEORGE A. PHAIL.
CHARLES SWANSON.

Witnesses:
W. P. HAMMOND,
P. F. SONNEK.